United States Patent
Tomosada et al.

(10) Patent No.: US 8,611,737 B2
(45) Date of Patent: Dec. 17, 2013

(54) LENS DRIVING DEVICE, CONTROL METHOD, AND LENS SYSTEM

(75) Inventors: Toshihiko Tomosada, Yokohama (JP); Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/326,784

(22) Filed: Dec. 15, 2011

(65) Prior Publication Data

US 2012/0163785 A1 Jun. 28, 2012

(30) Foreign Application Priority Data

Dec. 22, 2010 (JP) ................................ 2010-286525
Dec. 24, 2010 (JP) ................................ 2010-287085

(51) Int. Cl.
*G03B 13/36* (2006.01)

(52) U.S. Cl.
USPC ........................................................ 396/80

(58) Field of Classification Search
USPC ..................................................... 396/79–83
See application file for complete search history.

(56) References Cited

U.S. PATENT DOCUMENTS

| 4,825,237 A * | 4/1989 | Hatase et al. .................... 396/79 |
| 5,587,842 A * | 12/1996 | Iijima et al. .................... 359/698 |
| 7,692,711 B2 * | 4/2010 | Ohta .............................. 348/345 |
| 8,144,240 B2 * | 3/2012 | Song ............................. 348/356 |
| 2009/0237553 A1 * | 9/2009 | Song ............................. 348/349 |
| 2012/0163785 A1 * | 6/2012 | Tomosada et al. .............. 396/79 |

FOREIGN PATENT DOCUMENTS

JP 2003-241069 A 8/2003

\* cited by examiner

*Primary Examiner* — WB Perkey
(74) *Attorney, Agent, or Firm* — Canon U.S.A., Inc. IP Division

(57) ABSTRACT

A lens driving device includes a control unit configured to control movement of a first lens to perform zooming operation and a second lens to perform focus adjustment based on information of a position of the first lens and a position of the second lens stored for each object distance, and when the first lens is on a telephoto side of a predetermined position, the control unit limits movement of the second lens to a position corresponding to a second object distance closer than the first object distance, and if a predetermined condition is satisfied after the second lens has reached a predetermined region including the position corresponding to the first object distance, the control unit permits the movement of the second lens to the position corresponding to the second object distance.

12 Claims, 10 Drawing Sheets

DURING DETERMINATION

AFTER DETERMINATION

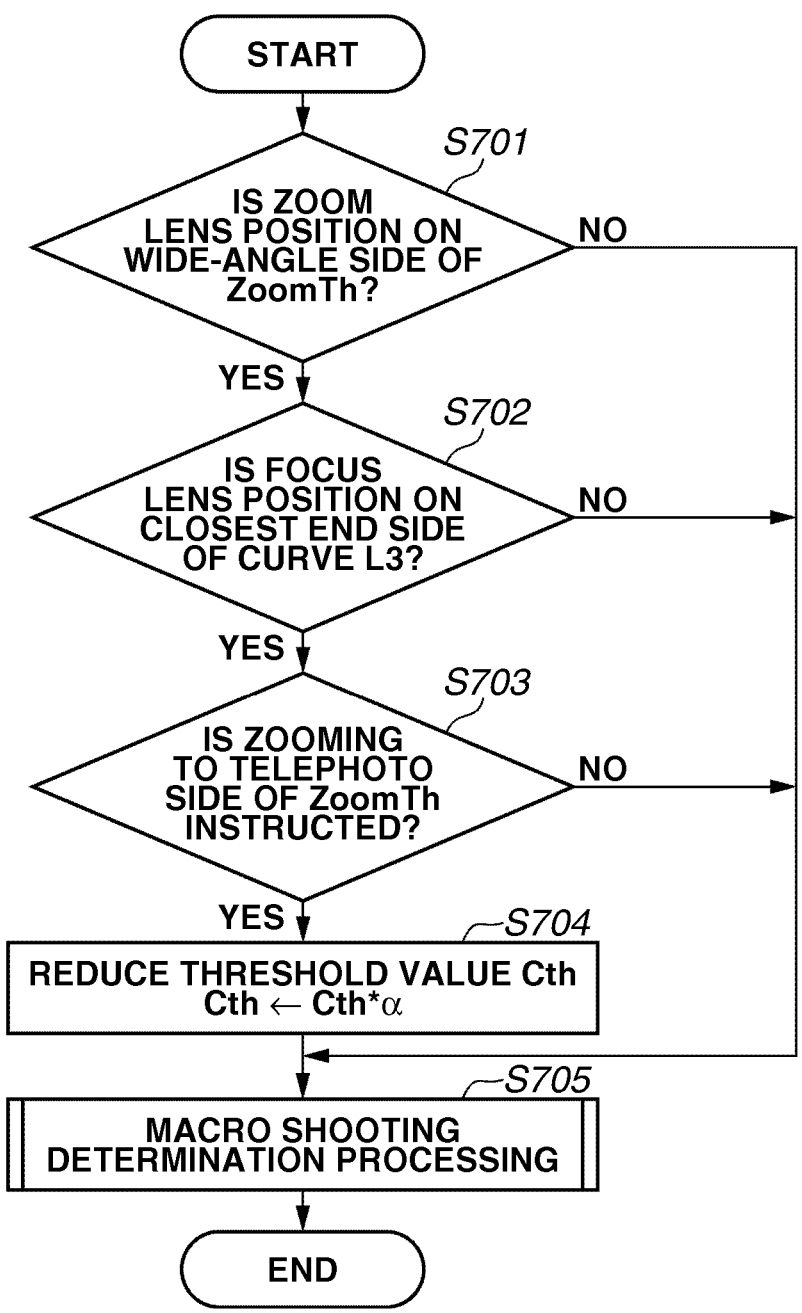

LENS DRIVING DEVICE, CONTROL METHOD, AND LENS SYSTEM

BACKGROUND OF THE INVENTION

1. Field of the Invention

Embodiments of the present invention relate to a lens driving device having a so-called tele-macro shooting mode useful for close-up shooting (macro shooting) on the telephoto side, and a lens system.

2. Description of the Related Art

Conventionally, there is known an imaging apparatus such as a digital video camera and a digital still camera having a so-called tele-macro shooting function that enables selection of a macro shooting mode. The imaging apparatus on the telephoto side in the macro shooting mode may focus on an object at a range so close that a sharp focus may not be obtained in the normal shooting mode.

In Japanese Patent Application Laid-Open No. 2003-241069, a user of such an imaging apparatus visually measures the distance to the object, and selects a shooting mode by a button or the like. Further, if focusing is not possible in the normal shooting mode, a warning is given to the user that the shooting mode needs to be changed.

However, according to the method discussed in Japanese Patent Application Laid-Open No. 2003-241069, the user of the imaging apparatus including the tele-macro shooting function needs to determine whether to select the normal shooting mode or the tele-macro shooting mode. This is not convenient for the user. Further, even if the object is very close to the imaging apparatus, in some cases, the user forgets to select the tele-macro shooting mode.

SUMMARY OF THE INVENTION

One disclosed aspect of the embodiments is directed to an imaging apparatus with a tele-macro shooting mode and capable of automatically changing the shooting mode to the tele-macro shooting mode, in other words, an imaging apparatus capable of performing automatic determination of close-up imaging on the telephoto side.

According to an aspect of the embodiments, there is provided a lens driving device including a control unit configured to control movement of a first lens configured to perform zooming operation and a second lens configured to perform focus adjustment based on information of a position of the first lens and a position of the second lens stored for each object distance, and when the first lens is on a telephoto side of a predetermined position, the control unit limits movement of the second lens to a position corresponding to a second object distance closer than the first object distance, and if a predetermined condition is satisfied after the second lens has reached a predetermined region including the position corresponding to the first object distance, the control unit permits the movement of the second lens to the position corresponding to the second object distance.

According to another aspect of the embodiments, there is provided a control method of a lens driving device including controlling movement of a first lens configured to perform zooming operation and a second lens configured to perform focus adjustment based on information of a position of the first lens and a position of the second lens stored for each object distance, and when the first lens is on a telephoto side of a predetermined position, movement of the second lens to a position corresponding to a second object distance closer than the first object distance is limited, and if a predetermined condition is satisfied after the second lens has reached a predetermined region including the position corresponding to the first object distance, the movement of the second lens to the position corresponding to the second object distance is permitted.

According to another aspect of the embodiments, there is provided a lens system including a first lens configured to perform zooming operation, and a second lens configured to perform focus adjustment, and when the first lens is on a telephoto side of a predetermined position, movement of the second lens to a position corresponding to a second object distance closer than the first object distance is limited, and if a predetermined condition is satisfied after the second lens has reached a predetermined region including the position corresponding to the first object distance, the movement of the second lens to the position corresponding to the second object distance is permitted.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the embodiments.

FIG. 7 is a flow chart illustrating the macro shooting determination processing according to a second exemplary embodiment.

DESCRIPTION OF THE EMBODIMENTS

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Configuration of the Apparatus

Figure 1:
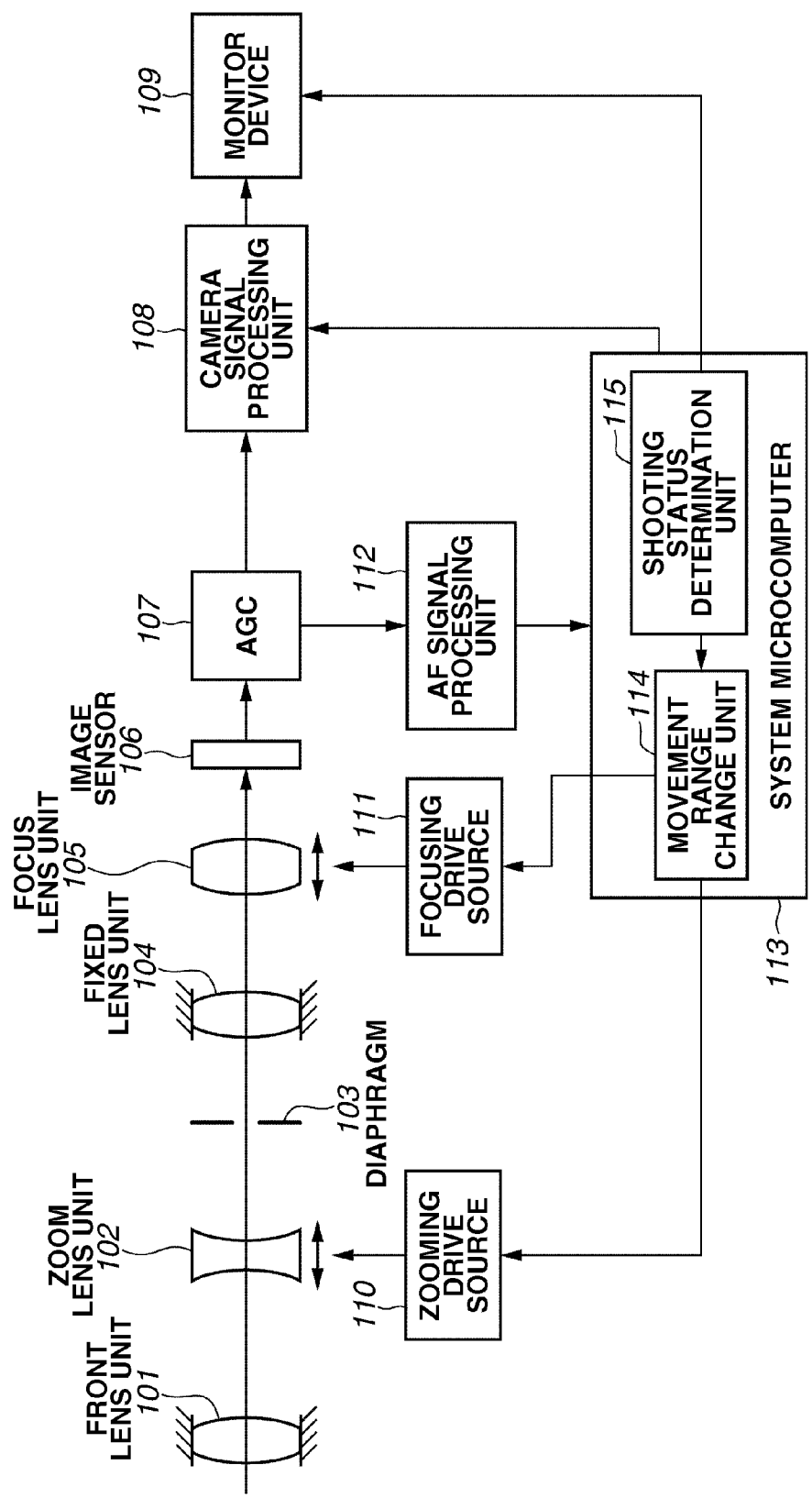
FIG. 1 is a block diagram illustrating a configuration of an imaging apparatus according to a first exemplary embodiment.

FIG. 1 illustrates a configuration of a video camera as an imaging apparatus including a lens system. A zoom lens unit and a focus lens unit are included in the lens system. The present embodiment is not limited to a video camera, and may be applied to various imaging apparatuses such as a digital still camera.

An imaging optical system of the lens system includes a front lens unit 101 which is fixed, a zoom lens unit 102 which moves in the optical axis direction and performs zooming operation, a diaphragm 103, a fixed lens unit 104, and a focus lens unit 105. The focus lens unit 105 has the focus adjustment function and the compensator function. The compensator function is used for correcting the image plane change caused by the zooming change. The focus lens unit 105 is positioned after the zoom lens unit 102 seen from the object side along the optical axis and moves in the optical axis direction.

The imaging optical system including these lens units is a rear focus lens type optical system including four lens units having positive, negative, positive, and positive optical powers seen from the object side (left side in FIG. 1).

Although it appears that each of the lens units in FIG. 1 includes only one lens, actually, the lens unit may include one or a plurality of lenses. Hereinafter, the zoom lens unit 102 is simply referred to as a zoom lens 102 and a focus lens unit 105 is simply referred to as a focus lens 105.

An image sensor 106 includes a charge-coupled device (CCD) sensor or a complementary metal oxide semiconductor (CMOS) sensor. The light flux from the object enters onto the image sensor 106 after passing through the imaging optical system. The image sensor 106 photoelectrically converts the incident light of the object image, and outputs an image signal.

The image signal is amplified by an automatic gain control (AGC) amplifier 107 to an optimum level, and the amplified image signal is input in a camera signal processing circuit 108. The camera signal processing circuit 108 converts the input image signal into a standard television signal. The television signal is transmitted to a monitor device 109 and displayed as the captured image. Information such as the current shooting mode and a warning is also displayed on the monitor device 109.

Further, the signal output from the AGC amplifier 107 is also input in an autofocus (AF) signal processing circuit 112. The AF signal processing circuit 112 detects an AF evaluation signal corresponding to the contrast of the captured image, which is a focus signal of a focus lens 105. The AF evaluation signal (sharpness signal) generated by the AF signal processing circuit 112 is read out as data by communication with a system microcomputer 113.

The system microcomputer 113 outputs a signal when the user operates an operation member (not illustrated) such as a zoom switch. The output signal corresponds to the direction the operation member is moved. A zooming drive source 110 moves the zoom lens 102 in the telephoto direction (telephoto side) or the wide-angle direction (wide-angle side) according to this signal.

Further, based on an AF evaluation signal obtained from the AF signal processing circuit 112, the system microcomputer 113 controls a focusing drive source 111. The focusing drive source 111 moves the focus lens 105 so that focus is obtained. This operation is the so-called AF operation.

Further, the system microcomputer 113 includes a shooting status determination unit 115 which determines whether the tele-macro shooting is to be performed based on a movement history of the focus lens 105. If the shooting status determination unit 115 determines that the tele-macro shooting is to be performed, the system microcomputer 113 changes the movement range (movable range) of the focus lens 105 from the range of the normal shooting mode to the range of the tele-macro shooting mode by a movement range change unit 114. In addition to the movement range of the normal shooting mode, the movement range in the tele-macro shooting mode includes the range extended to the closest end side.

Further, the shooting status determined by the shooting status determination unit 115 is displayed on the monitor device 109 so that the user may check the status. The shooting status determination unit 115 controls the monitor device 109 so that the movable range of the focus lens on the telephoto side of a predetermined zoom lens position is displayed on the monitor device 109. This state is displayed for a predetermined period of time so that the user may check the movable range of the focus lens.

Operation Region of the Zoom Lens and the Focus Lens

Next, an operation region of the zoom lens 102 and the focus lens 105 of the imaging apparatus of the present embodiment in the normal shooting mode and the tele-macro shooting mode in a position space determined by the movement range of the zoom lens 102 and the movement range of the focus lens 105 will be described with reference to FIG. 2.

Figure 2:
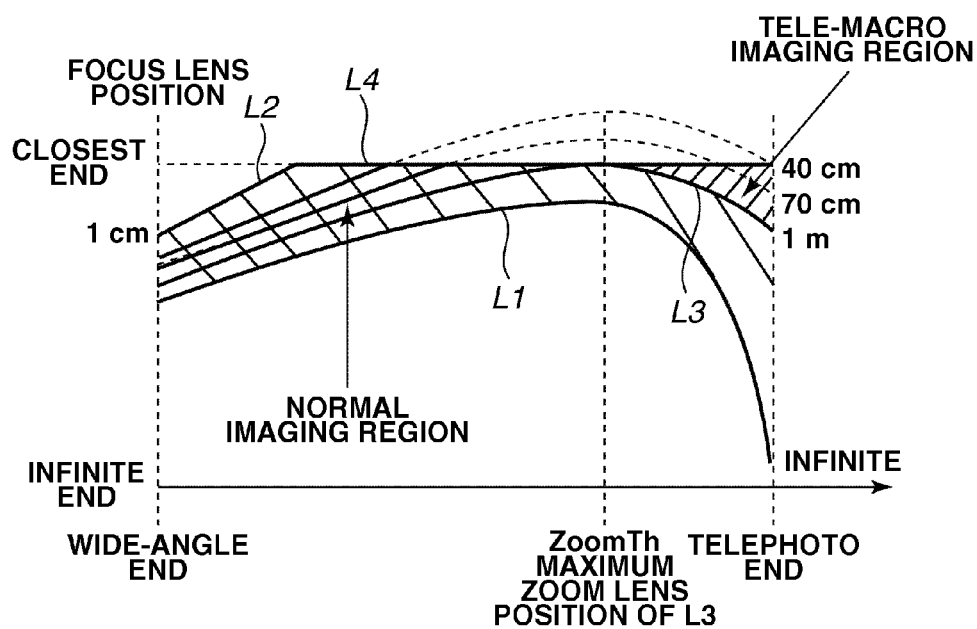
FIG. 2 is a conceptual diagram illustrating an operation region of the imaging apparatus in normal shooting and tele-macro shooting modes.

The horizontal axis of the position space in FIG. 2 represents the movement range of the zoom lens 102. The left side of the graph is the wide-angle side and the right side is the telephoto side. Further, the vertical axis represents the movement range of the focus lens 105. The lower side of the graph is the infinite end side and the upper side of the graph is the closest end side.

Each of the curves in FIG. 2 is a locus (cam locus) of the points obtained by a combination of the zoom lens position and the focus lens position that may keep in-focus state for each of a plurality of object distances.

A curve L1 is a locus of points determined by a combination of a zoom lens position and a focus lens position that enables an object at an infinite distance to be in-focused state.

A curve L2 is a locus of points determined by a combination of a zoom lens position and a focus lens position that enables an object to be in-focused state at the shortest imaging distance (e.g., 1 cm) for the wide-angle end.

A curve L3 is a locus of points determined by a combination of a zoom lens position and a focus lens position that enables an object to be in-focused state at the shortest imaging distance (e.g., 1 m) on the telephoto end in the normal shooting mode.

A straight line L4 indicates the movement limit of the focus lens 105 on the closest end side with the limit determined by the maximum point of the curve L3. ZoomTh is the position of the zoom lens at the maximum point of the curve L3.

In the normal shooting mode, the imaging region is represented by the region surrounded by the curves L1, L2, L3, and L4 (closest end). When the apparatus is in the normal shooting mode, the focus lens position may be adjusted in this normal imaging region.

Further, as illustrated in FIG. 2, the tele-macro shooting region is the region on the telephoto side of the zoom lens position ZoomTh where the curve L3 reaches the maximum point, and surrounded by the curve L3 and the closest end of the focus lens 105.

Figure 3:
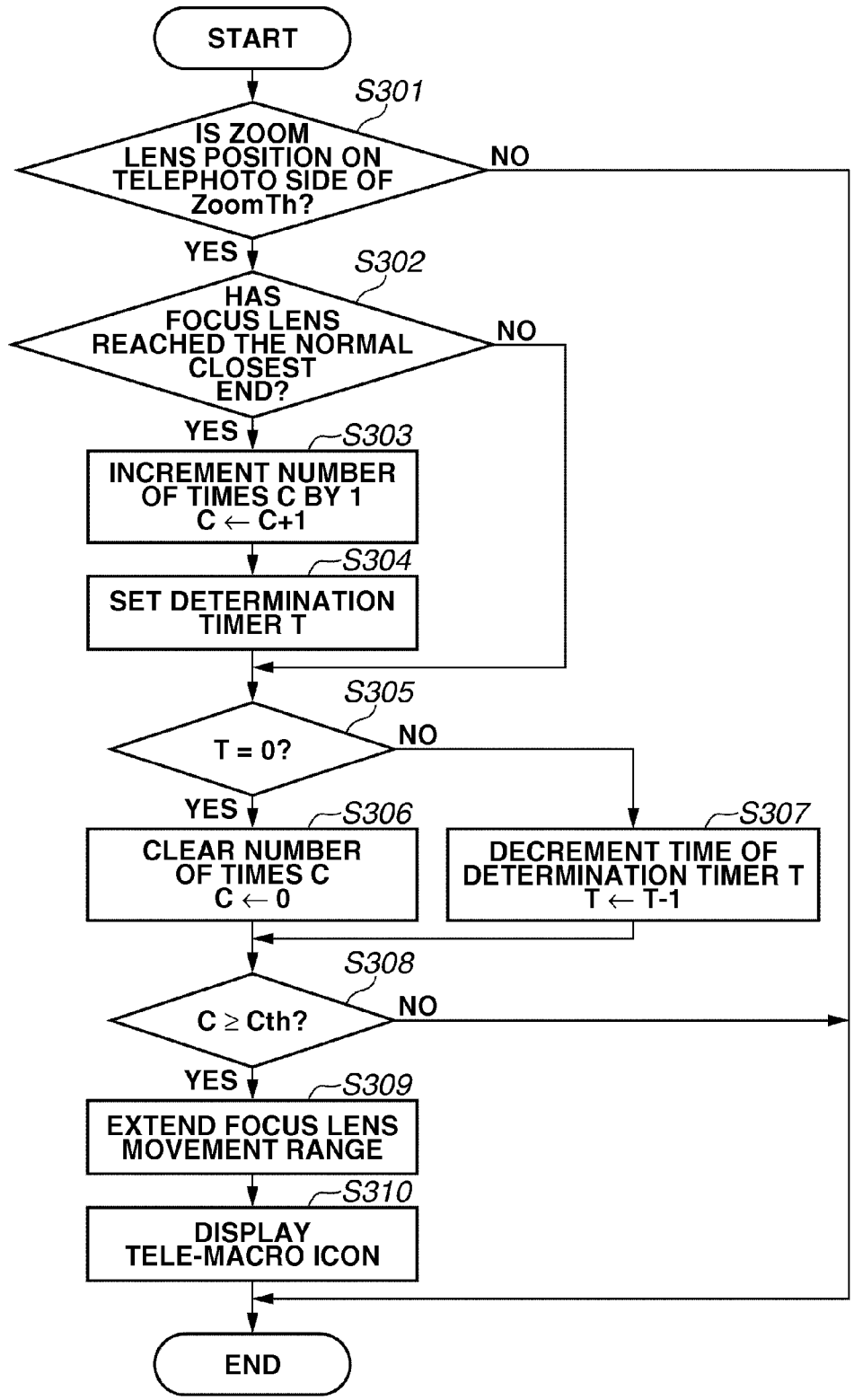
FIG. 3 is a flow chart illustrating macro shooting determination processing according to the first exemplary embodiment.

In the tele-macro shooting region, since the shortest imaging distance decreases as the position approaches the wide-angle end, if zooming to the wide-angle side is performed after the focus of the image is obtained on the telephoto side, the image will be out of focus during the course of movement. As described above, the tele-macro shooting region is extended to the closest end compared to the normal imaging region. Shooting status determination method and control after determination Next, the method of the shooting status determination and the control after the determination of the shooting status will be described. FIG. 3 illustrates a processing flow of the tele-macro shooting determination processing and the tele-macro shooting mode processing according to the present exemplary embodiment. The processing illustrated in FIG. 3 is executed in synchronization with a vertical synchronization signal. According to a computer program stored in the system microcomputer 113, the processing is executed once for one vertical synchronization time (1 V).

In operation S301, the shooting status determination unit 115 determines whether the zoom lens position is on the telephoto side of ZoomTh. If the zoom lens position is on the telephoto side of ZoomTh (YES in operation S301), the processing proceeds to operation S302, and the macro shooting determination processing is performed. If the zoom lens position is not on the telephoto side of ZoomTh (i.e., on the wide-angle side) (NO in operation S301), the processing ends.

According to the present exemplary embodiment, since ZoomTh is the maximum zoom lens position of the curve L3, the macro shooting determination processing is not performed on the wide-angle side of ZoomTh. However, ZoomTh may be shifted so that the macro shooting determination processing is performed on the wide-angle side of a zoom lens position, which is the maximum point of the curve L3. Further, the macro shooting determination may be weighted according to the zoom position.

Figure 4:
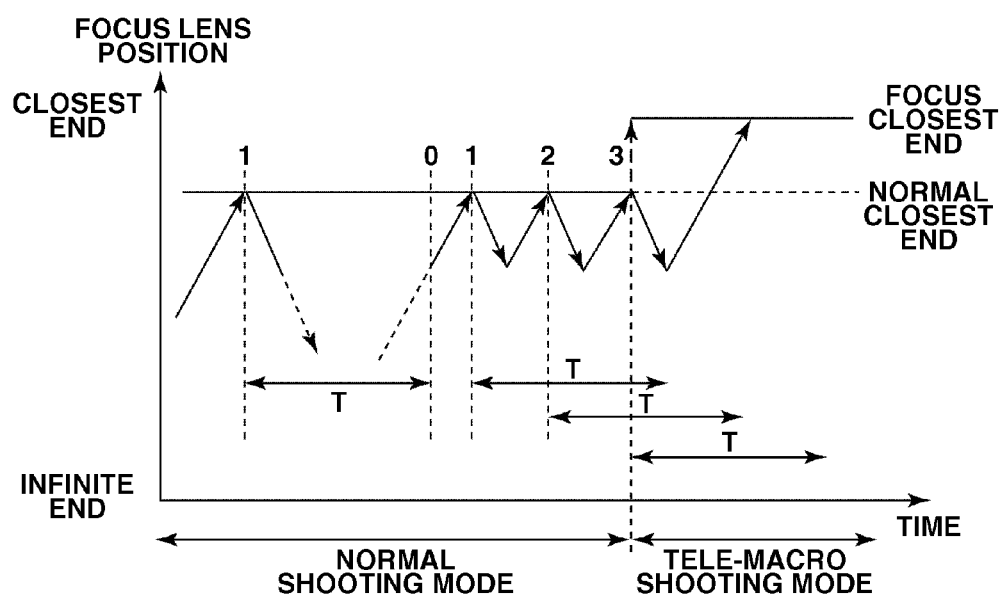
FIG. 4 is a conceptual diagram illustrating the macro shooting determination processing according to the first exemplary embodiment.

Processing in and after operation S302 will be described with reference to FIG. 4. FIG. 4 is a schematic diagram of the focus lens 105 hunting near the closest end of the normal region. The horizontal axis of the graph in FIG. 4 represents time and the vertical axis represents the position of the focus lens 105. Further, the lower side is the infinite end side and the upper side is the closest end side.

In operation S302, the shooting status determination unit 115 determines whether the focus lens has reached the closest end of the normal region. The closest end of the normal region is hereinafter referred to as the normal closest end. If the focus lens has reached the normal closest end (YES in operation S302), the processing proceeds to operation S303. If the focus lens has not reached the normal closest end yet (NO in operation S302), the processing proceeds to operation S305.

Figure 5A:
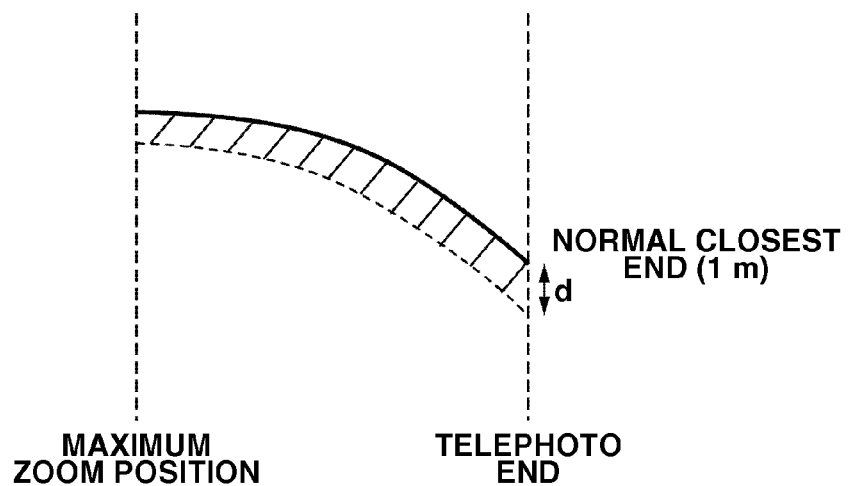
FIGS. 5A and 5B are conceptual diagrams illustrating region setting of the macro shooting determination.
Figure 5B:
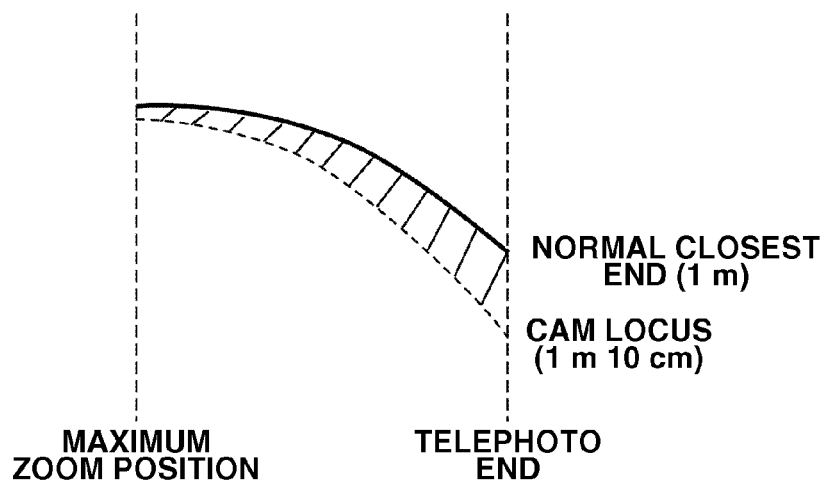

According to the present exemplary embodiment, although the determination is made depending on whether the focus lens position has reached the normal closest end, as illustrated in FIGS. 5A and 5B, the determination may be also made based on whether the focus lens 105 exists in a region including the normal closest end and having a predetermined width (shaded areas in FIGS. 5A and 5B). For example, if a region surrounded by the locus of the normal closest end and a locus of points which are a certain width "d" away from the normal closest end is set as illustrated in FIG. 5A, the determination may be made not by the zoom position but according to whether the focus lens 105 is in that region.

Further, as illustrated in FIG. 5B, if the determination region is set to a region surrounded by the locus of the normal closest end and a locus corresponding to an object distance some distance closer to the infinite side (e.g., 1 m 10 cm in FIG. 5B) is set, the determination may be made according to whether the focus lens 105 is in that region.

Prior to processing in operations 5301 and 5302, the system microcomputer 113 acquires the current position of the zoom lens 102 and the current position of the focus lens 105. If a pulse motor is used for the zooming drive source 110 and for the focusing drive source 111, the zoom lens position and the focus lens position are presented as a pulse number necessary for moving thereof from the reference position to the current position.

The reference position is a position used as a reference when the position of the lens is controlled. The lens is set to the reference position when the operation of the imaging apparatus is started. A reference position sensor includes a photo interrupter (not illustrated). The photo interrupter includes an integrated light-emitting element and a light-receiving element. The zoom lens position and the focus lens position may be directly detected by a position detection sensor.

In operation S303, the shooting status determination unit 115 increments the number of times C the focus lens 105 has reached the normal closest end by 1, and then the processing proceeds to operation S304. The figure provided at the upper portion of the graph in FIG. 4 is a number of times C the focus lens 105 has reached the normal closest end. When the focus lens 105 reaches the normal closest end, the number of times C is incremented.

In operation S304, the shooting status determination unit 115 sets a determination timer T (first time) used for the tele-macro shooting determination, and the processing proceeds to operation S305. Although the determination timer T is set to a time determined in advance (predetermined time) according to the present embodiment, a different time may be set according to the shutter speed or the frame rate which is changed according to the accumulated time of the image sensor 106.

Generally, when the accumulated time is increased, the drive period of the focus lens is also increased. Thus, the period of the focus lens reaching the normal closest end may also be increased. If a long time is set for the determination timer T when the shutter speed is slow or the frame rate is low, since the number of times the focus lens 105 reaches the normal closest end in the determination time will be increased, the determination regarding whether the focus lens has reached the normal closest end may be performed as the determination is performed when the shutter speed is normal.

In operation S305, the shooting status determination unit 115 determines whether the time of the determination timer T set in operation S304 is 0. If the time is 0 (YES in operation S305), the processing proceeds to operation S306. If the time is not 0 (NO in operation S305), the processing proceeds to operation S307. In operation S306, the shooting status determination unit 115 determines that the condition of the tele-macro shooting has not been satisfied in the determination time set in operation S304, and clears the number of times C. Then, the processing proceeds to operation S308.

In FIG. 4, the focus lens does not reach the normal closest end within the time of the determination timer T from when the focus lens has reached the normal closest end for the first time. Since the number of times C is not equal to or greater than a threshold value Cth described below, the number of times C is set to 0 (i.e., the determination state is reset).

In operation S307, the shooting status determination unit 115 decrements the determination timer T, and then the processing proceeds to operation S308.

In operation S308, the shooting status determination unit 115 determines whether the number of times C is equal to or greater than the threshold value Cth set in advance (three in FIG. 4). If the number of times C is equal to or greater than the threshold value Cth (YES in operation S308), the processing proceeds to operation S309. If the number of times C is smaller than the threshold value Cth (NO in operation S308), then the processing ends.

In FIG. 4, after the focus lens has reached the normal closest end for the second time (C=1), the focus lens reaches the normal closest end again (C=2) before the elapse of the time of the determination timer T.

Further, after the focus lens has reached the normal closest end for the third time (C=2), the focus lens reaches the normal closest end again (C=3) before the elapse of the time of the determination timer T. Since the number of times C has reached the threshold value Cth (three), the shooting status determination unit 115 changes the mode to the tele-macro shooting mode.

According to the present exemplary embodiment, although the threshold value Cth is set to a value determined in advance, as is the case with the determination timer T, the threshold value Cth may be changed according to the accumulated time of the image sensor 106.

If a larger value is set for the threshold value Cth, although longer time will be necessary in determining whether the mode is the macro shooting mode, it helps reduce the possibility of erroneous determination (e.g., determination that the mode is the macro shooting mode despite the user's intention).

On the other hand, if a small value is set for the threshold value Cth, although whether the mode is the macro shooting may be quickly determined, the possibility of erroneous determination will be increased. Thus, the above-described determination timer T and threshold value Cth are set based on sufficient verification and consideration of the balance of response and stability of the macro shooting determination.

Further, the threshold value Cth may be set to a greater value the more the zoom lens position is distant from the telephoto end. Regarding the tele-macro region, the more the zoom lens position is distant from the telephoto end, the more the shortest imaging distance that allows macro shooting is increased. This reduces the merit of macro shooting. Thus, by setting a greater threshold value Cth the more the zoom position is moved to the wide-angle side, the more it becomes difficult for the apparatus to perform the macro shooting from the telephoto side.

Further, in operation S308, the shooting status determination unit 115 may determine whether to change to the tele-macro shooting mode according to whether the focus lens 105 is in a region including the normal closest end and having a predetermined width (the shaded areas in FIGS. 5A and 5B), for a predetermined period of time (second time) or more.

In operation S309, the movement range change unit 114 extends the movement range of the focus lens 105, and the processing proceeds to operation S310. According to the present exemplary embodiment, the movement range change unit 114 cancels the control end on the closest end side of the focus lens. In other words, the control end, which is limited to 1 m when the normal shooting is being performed, is cancelled and reset so that it is movable to the focus closest end. In this manner, the focus in the region including the tele-macro region may be adjusted.

Figure 6A:
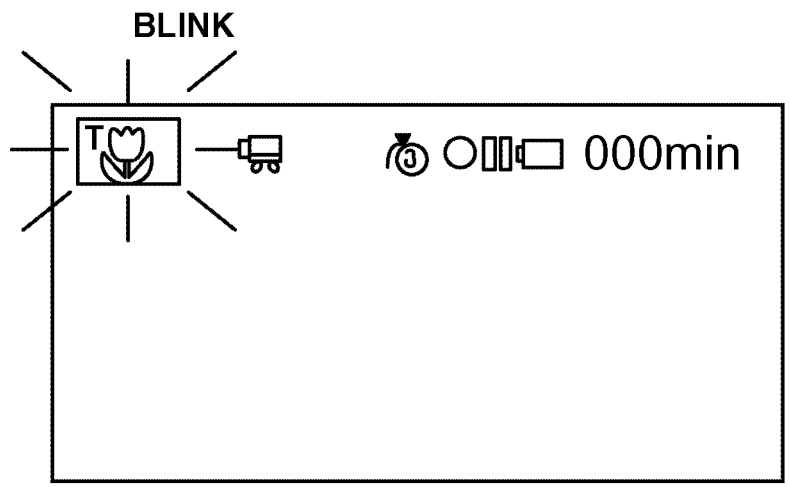
FIGS. 6A and 6B are conceptual diagrams illustrating display of the macro shooting determination.
Figure 6B:
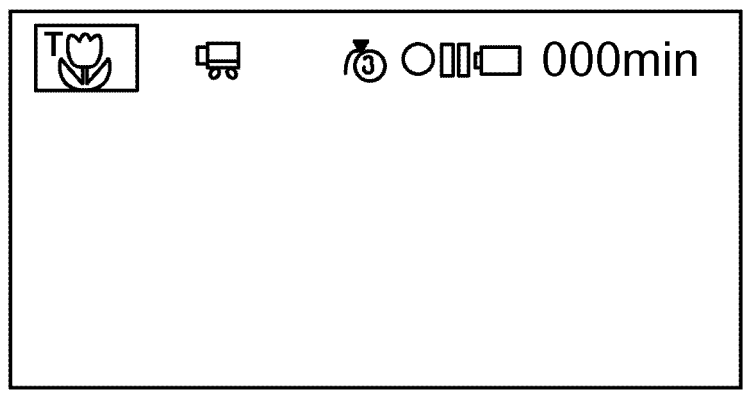

In operation S310, the shooting status determination unit 115 displays the tele-macro icon on the monitor device 109 so as to notify the user that the mode of the apparatus is changed to the tele-macro shooting mode. The display method of the icon may be changed so that the user may easily notice that the macro shooting determination is being performed. For example, if a blinking icon is displayed when the determination is performed as illustrated in FIG. 6A and the icon stops blinking after the determination is finished as illustrated in FIG. 6B, the user may notice the current state more easily.

According to the present exemplary embodiment, an icon is displayed on the monitor device 109 when the normal shooting mode is changed to the tele-macro shooting mode. However, different icons may be used for the normal shooting mode and the tele-macro shooting mode. In other words, a first icon may be used when the apparatus is in the normal shooting mode, and if the movement range of the focus lens is extended to the tele-macro region in operation S309, then a second icon different from the first icon may be used.

Further, when the zoom lens is on the wide-angle side of ZoomTh, and the apparatus focuses on an object at a close position (e.g., 30 cm or less), a third icon different from the first and the second icons may be used. By displaying such icons, the user may recognize the current shooting status more accurately, and convenience is improved.

Further, it is possible not to perform the macro shooting determination processing while the zoom lens is moving, and priority may be given to the following of the cam locus while the zoom lens is moving. Then, when the zoom lens is stopped, the above-described macro shooting determination processing is performed.

As described above, according to the present exemplary embodiment, the normal shooting mode may be automatically changed to the tele-macro shooting mode without the user's operation of the switch. Further, since the timing the mode is changed to the tele-macro shooting mode is controlled based on the number of times the focus lens 105 has reached the normal closest end, possibility of making erroneous determination (i.e., macro shooting is to be performed) despite the user's intention, may be reduced.

According to the first exemplary embodiment, the macro shooting determination processing is performed when the zoom lens position is on the telephoto side of ZoomTh. According to a second exemplary embodiment, the condition of macro shooting determination, for example, the condition of the threshold value Cth used for the determination is relaxed by using the movement history of the zoom lens 102 and the focus lens 105 before the determination processing is performed. By relaxing the condition, improved response of the macro shooting determination is realized.

According to the present exemplary embodiment, in a state where the apparatus is imaging an object at a close range on the wide-angle side, if it is zoomed on the telephoto side, the shooting status determination unit determines that the apparatus continues to perform imaging at the close range, and the mode is changed to the tele-macro shooting mode at faster timing than usual.

Shooting Status Determination Method and Control after Determination

FIG. 7 is a flow chart illustrating the macro shooting determination processing according to a second exemplary embodiment of the present invention. In operation S701, the shooting status determination unit 115 determines whether the zoom lens position is on the wide-angle side of ZoomTh. If the zoom lens position is on the wide-angle side (YES in operation S701), the processing proceeds to operation S702. If the zoom lens position is on the telephoto side (NO in operation S701), the processing proceeds to operation S705. In operation S705, the macro shooting determination processing is performed. The macro shooting determination processing performed in operation S705 corresponds to the processing of the first exemplary embodiment described with reference to FIG. 3.

In operation S702, the shooting status determination unit 115 determines whether, the focus lens position is on the closest end side of the curve L3 illustrated in FIG. 2 (cam locus of 1 m according to the present exemplary embodiment). If the focus lens position is on the closest end side (YES in operation S702), the processing proceeds to operation S703. If the focus lens position is not on the closest end side (NO in operation S702), the processing proceeds to operation S705.

The focus lens position where the zoom lens position is on the wide-angle side of ZoomTh is stored each time in a storage unit (not illustrated) as history information together with the position information of the zoom lens. According to the present embodiment, although the shooting status determination unit 115 determines whether the focus lens position is on the closest end side of the curve L3 in operation S702, cam locus corresponding to other object distance may also be used.

Further, in place of the focus lens position, an object distance calculated by using the focus lens position may be stored in the storage unit. Further, the apparatus may be configured so that a close range flag is set if it is determined that the object distance is shorter than a predetermined object distance (1 m according to the present exemplary embodiment).

In operation S703, the shooting status determination unit 115 determines whether the movement of the zoom lens to the telephoto side of ZoomTh has been instructed. If such an instruction is given (YES in operation S703), the processing proceeds to operation S704. If such an instruction is not given (NO in operation S703), the processing proceeds to operation S705.

In operation S704, the threshold value Cth of the number of times the focus lens has reached the closest end used in the macro shooting determination processing performed in operation S705 is set to a smaller value. According to the present exemplary embodiment, by multiplying a coefficient α which is smaller than 1 (e.g., 0.8), a value smaller than the threshold value Cth may be obtained. By relaxing the threshold value used in the determination, the response of macro shooting determination may be improved.

As described above, according to the present exemplary embodiment, by using the movement history of the zoom lens and the focus lens before the macro shooting determination processing, the threshold value of the determination under a predetermined condition may be reduced. Thus, the normal shooting mode may be automatically changed to the tele-macro shooting mode at faster timing.

According to the first and the second exemplary embodiments, the normal shooting mode is automatically changed to the tele-macro shooting mode. According to a third exemplary embodiment, in addition to the change from the normal shooting mode to the tele-macro shooting mode, the tele-macro shooting mode may be automatically cancelled.

Change to the Tele-Macro Shooting State and Cancel Method

Figure 8:
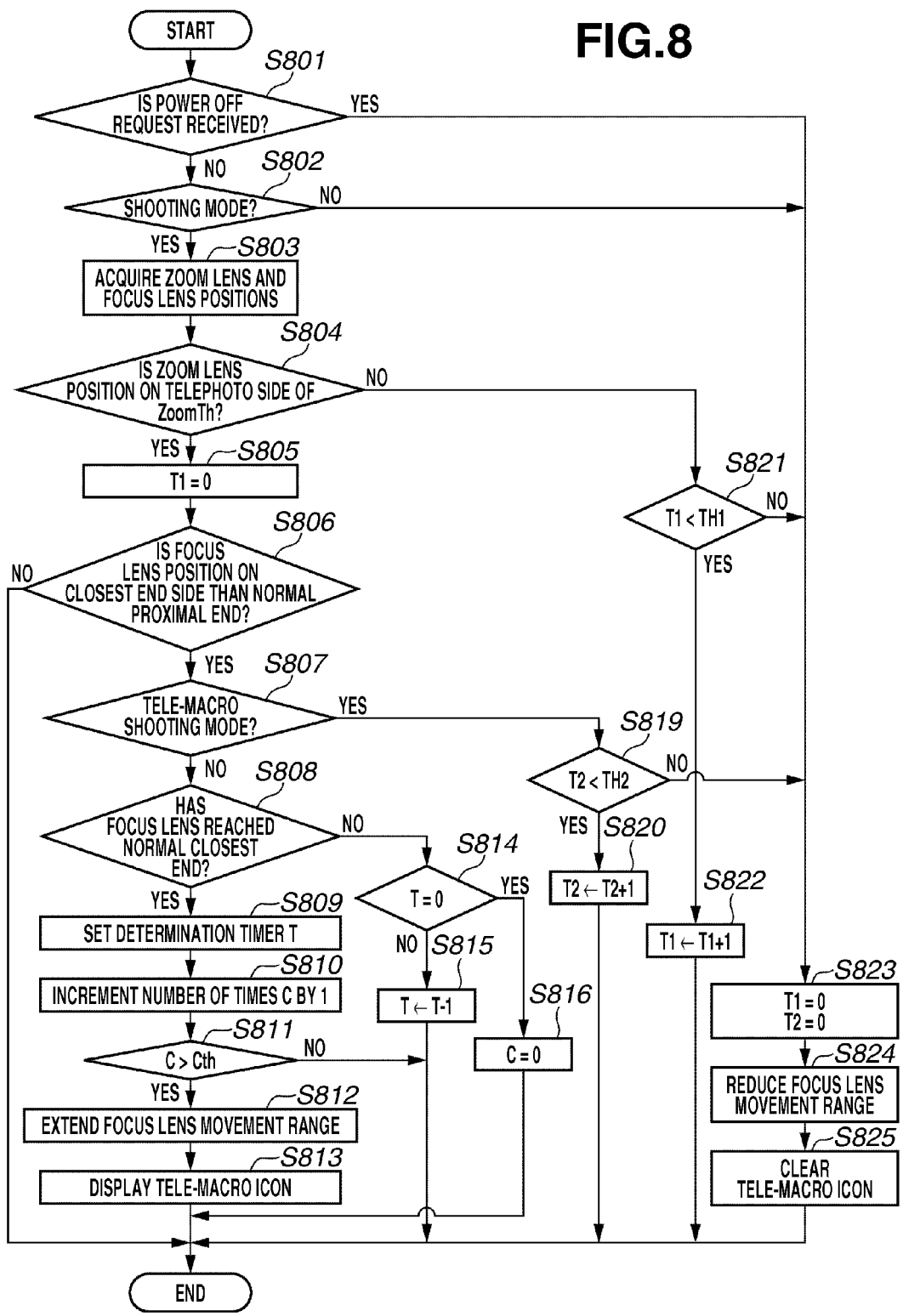
FIG. 8 is a flow chart illustrating the macro shooting determination processing according to a third exemplary embodiment.

Change to tele-macro shooting state and cancel method executed in the system microcomputer 113 will be described with reference to the flowchart in FIG. 8.

In operation S801, the system microcomputer 113 determines whether a power off request of the imaging apparatus main body is received. If the power off request is received (YES in operation S801), the processing proceeds to operation S823. If not (NO in operation S801), the processing proceeds to operation S802.

In operation S802, the system microcomputer 113 determines whether the current mode is the shooting mode. If the current mode is the shooting mode (YES in operation S802), the processing proceeds to operation S803. If the current mode is not the shooting mode (e.g., reproduction mode) (NO in operation S802), then the processing proceeds to operation S823.

In operation S803, the system microcomputer 113 acquires the current position of the zoom lens 102 and the current position of the focus lens 105. If a pulse motor is used for each of the zooming drive source 110 and the focusing drive source 111, the zoom lens position and the focus lens position are represented by a pulse number necessary in moving the lens from the reference position to the current position. The reference position is used as a reference when the position of the lens is controlled. When the imaging apparatus is started, the lens is set at the reference position.

The reference position sensor (not illustrated) includes a photo interrupter including a light emitting element and a light receiving element. The zoom lens position and the focus lens position may be directly detected by a position detection sensor.

In operation S804, the shooting status determination unit 115 determines whether the position of the zoom lens acquired in operation S803 is on the telephoto side of ZoomTh. If the zoom lens is on the telephoto side (YES in operation S804), the processing proceeds to operation S805. If the zoom lens is not on the telephoto side (NO in operation S804), the processing proceeds to operation S821.

According to the present exemplary embodiment, since ZoomTh is the maximum zoom lens position of the curve L3, the macro shooting determination processing is not performed on the wide-angle side of ZoomTh. However, ZoomTh may be shifted so that the macro shooting determination processing is performed on the wide-angle side of the zoom lens position being the maximum point of the curve L3. Further, the determination may be weighted according to the zoom lens position.

In operation S805, the shooting status determination unit 115 clears a macro shooting cancel counter T1 described below, and then the processing proceeds to operation S806.

In operation S806, the shooting status determination unit 115 determines whether the focus position is on the infinite end side of the normal closest end. If the focus position is on the infinite end side (YES in operation S806), the processing proceeds to operation S807. If the focus position is on the closest end side (NO in operation S806), since the current mode is the tele-macro shooting mode, the mode change is not performed, and then the processing ends.

In operation S807, the shooting status determination unit 115 determines whether the current shooting mode is the tele-macro shooting mode. If the current shooting mode is the tele-macro shooting mode (YES in operation S807), the processing proceeds to operation S819. If not (NO in operation S807), the processing proceeds to operation S808.

Next, the processing on and after operation S808 will be described with reference to FIG. 4. In operation S808, the shooting status determination unit 115 determines whether the focus lens position has reached the normal closest end. If the focus lens position has reached the normal closest end (YES in operation S808), the processing proceeds to operation S809. If the focus lens position has not reached the normal closest end yet (NO in operation S808), the processing proceeds to operation S814.

According to the present exemplary embodiment, although the determination is made depending on whether the focus lens position has reached the normal closest end as described in the first exemplary embodiment, it is also possible to make the determination based on whether the focus lens 105 is in the region including the normal closest end and having a predetermined width as illustrated in FIGS. 5A and 5B (the shaded areas).

In operation S809, the shooting status determination unit 115 sets the determination timer T used for the tele-macro shooting determination, and the processing proceeds to operation S810. Although the determination timer T is set to a time determined in advance (predetermined time) according to the present exemplary embodiment, as described in the first exemplary embodiment, a different time may be set according to the shutter speed or the frame rate that changes according to the accumulated time of the image sensor 106.

In operation S810, the shooting status determination unit 115 increments the number of times C, and the processing proceeds to operation S811.

In operation S811, the shooting status determination unit 115 determines whether the number of times C is equal to or greater than the threshold value Cth (three times in FIG. 4) set in advance. If the number of times C is equal to or greater than the threshold value Cth (YES in operation S811), the processing proceeds to operation S812. If the number of times C is smaller than the threshold value Cth (NO in operation S811), then the processing ends.

According to the present exemplary embodiment, although the threshold value Cth is set to a value determined in advance, as is the case with the determination timer T, the threshold value Cth may be changed according to the accumulated time of the image sensor 106. The threshold value Cth is set in a manner similar to the setting method described in the first exemplary embodiment.

In operation S812, the movement range change unit 114 extends the movement range of the focus lens 105, and the processing proceeds to operation S813. According to the present exemplary embodiment, the movement range change unit 114 cancels the control end on the closest end side of the focus lens. In other words, the control end, which has been limited to 1 m when the normal shooting is being performed, is cancelled and reset so that it is movable to the focus closest end. In this manner, the focus adjustment of the region including the tele-macro region becomes possible.

In operation S813, the shooting status determination unit 115 displays the tele-macro icon on the monitor device 109 so that the user may notice that the mode has been changed to the tele-macro shooting mode. Although the tele-macro icon is displayed when the mode is changed to the tele-macro shooting mode according to the present exemplary embodiment, different icons may be set and displayed for the normal shooting mode and the tele-macro shooting mode as is described in the first exemplary embodiment.

In operation S814, the shooting status determination unit 115 determines whether the determination timer T set in operation S809 is 0. If the determination timer T is 0 (YES in operation S814), the processing proceeds to operation S816. If the determination timer T is not 0 (NO in operation S814), the processing proceeds to operation S815.

In operation S815, the shooting status determination unit 115 decrements the time of the determination timer T, and then the processing ends. In operation S816, the shooting status determination unit 115 determines that the condition of the tele-macro shooting has not been satisfied within the time determined in operation S809, and clears the number of times C. Then the processing ends.

In operation S807, if the shooting status determination unit 115 determines that the current shooting mode is the tele-macro shooting mode (YES in operation S807), the processing proceeds to operation S819. In operation S819, the shooting status determination unit 115 determines whether a macro shooting mode cancel counter T2 (time counter) is smaller than TH2. If the macro shooting mode cancel counter T2 is smaller than TH2 (YES in operation S819), the processing proceeds to operation S820. If not (NO in operation S819), the processing proceeds to operation S823. In operation S820, the shooting status determination unit 115 increments the macro shooting mode cancel counter T2 by 1, and then the processing ends.

TH2 is a time threshold value, and is set to a value greater than the time the focus lens 105 may travel between the focus positions of the normal closest end and the infinite side control end of the focus lens 105.

In operation S804, if the zoom lens position is on the wide-angle side of ZoomTh (NO in operation S804), the processing proceeds to operation S821. In operation S821, the shooting status determination unit 115 determines whether the macro shooting cancel counter T1 is smaller than TH1. If the macro shooting cancel counter T1 is smaller than TH1 (YES in operation S821), the processing proceeds to operation S822. If the macro shooting cancel counter T1 is not smaller than TH1 (NO in operation S821), the processing proceeds to operation S823. In operation S822, the shooting status determination unit 115 increments the macro shooting cancel counter T1 by 1, and then the processing ends.

The macro shooting cancel counter T1 is a time counter which is incremented when the zoom lens position is on the wide-angle side of ZoomTh. When the macro shooting cancel counter T1 exceeds TH1, the tele-macro shooting mode is cancelled. TH1 is set to a time longer than the time the zoom lens 102 takes in traveling between ZoomTh and the telephoto end.

In operation S823, the shooting status determination unit 115 clears the above-described macro shooting cancel counter T1 and the macro shooting mode cancel counter T2, and the processing proceeds to operation S824. Thereafter, the processing proceeds to operation S825, then the processing ends.

In operation S824, the movement range change unit 114 reduces the movement range of the focus lens, and sets the controlled closest end as the closest end in the normal shooting mode, and the processing proceeds to operation S825.

In operation S825, in order to notify the user that the mode has been changed to the normal shooting mode, the shooting status determination unit 115 sets the tele-macro icon set in operation S813 to non-display state on the monitor device 109. Further, if the mode is changed from the tele-macro shooting mode to the normal shooting mode, as described in the first exemplary embodiment, the display may be changed from the second icon to the first icon.

Further, the macro shooting determination processing may be controlled so as not to be performed while the zoom lens is moving. For example, priority may be given to the following of the cam locus when the zoom lens is moving. Then, when the zoom lens is stopped, the above-described macro shooting determination processing is performed.

According to the above-described exemplary embodiment, when the power off request is given, the movement range of the focus lens is reduced by the movement range change unit 114 and the tele-macro icon is changed to non-display state on the monitor device 109.

However, after the power is turned off, if a request for turning on the power is received, the movement range of the focus lens may be reduced by the movement range change unit 114, and the tele-macro icon may be set to non-display state on the monitor device 109.

As described above, according to the present exemplary embodiment, the tele-macro shooting mode may be automatically cancelled without the user changing the operation switch. Thus, the possibility of mis-operation due to the user forgetting to cancel the tele-macro shooting mode may be reduced.

<Configuration of the Apparatus>

Figure 9:
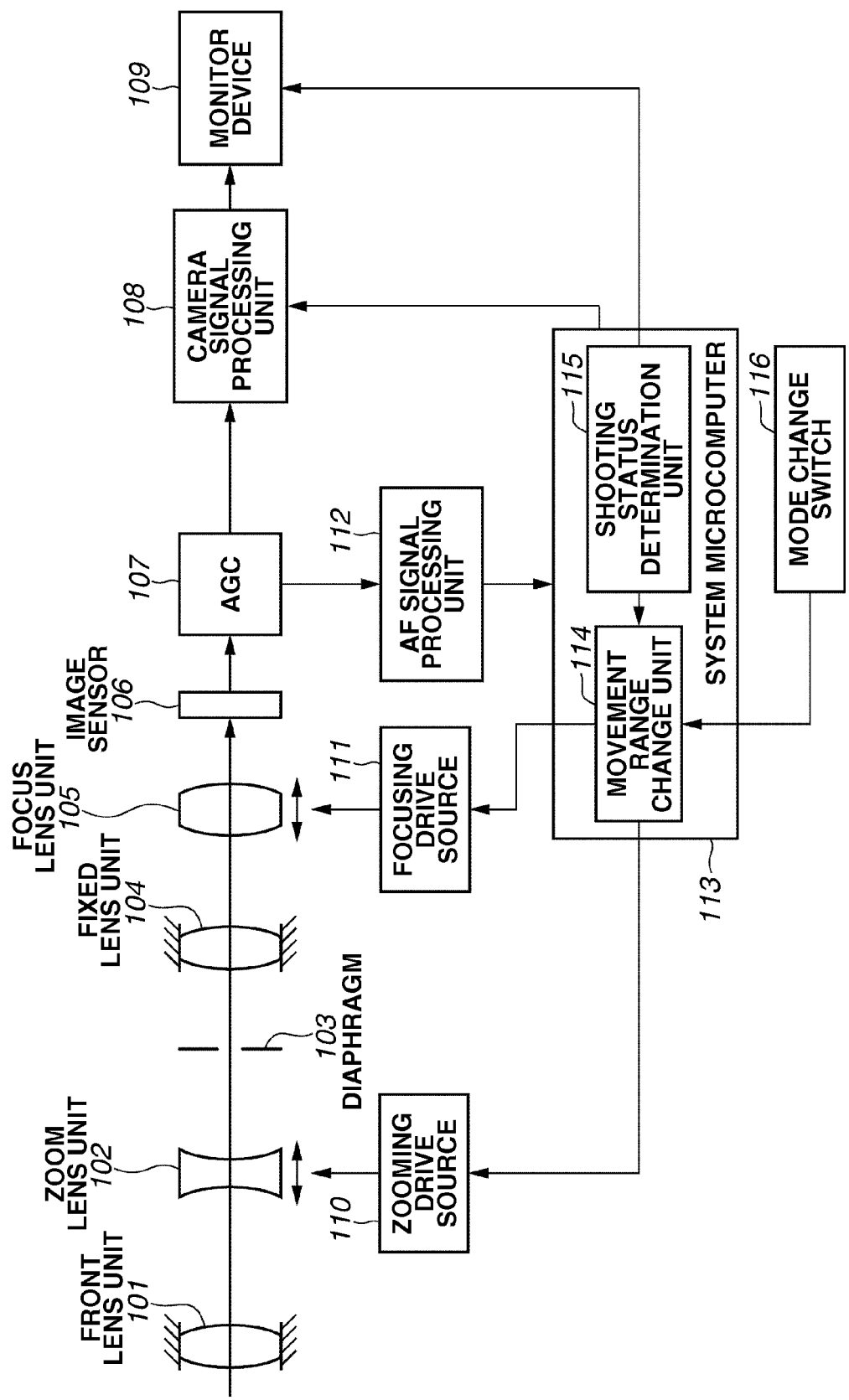
FIG. 9 is a block diagram illustrating a configuration of the imaging apparatus according to a fourth exemplary embodiment.

FIG. 9 illustrates a configuration of a video camera (imaging apparatus) according to a fourth exemplary embodiment of the present invention. The imaging apparatus in FIG. 9 is the same as the imaging apparatus illustrated in FIG. 1 and described in the first exemplary embodiment except that it includes a tele-macro mode change switch 116.

The tele-macro mode change switch 116 is used for selecting whether to use the tele-macro shooting mode, and is connected to the system microcomputer 113. The tele-macro mode change switch 116 is manually operated by the user when the user changes the mode to the tele-macro shooting mode.

Change to the Tele-Macro Shooting State and Cancel Method

Figure 10:
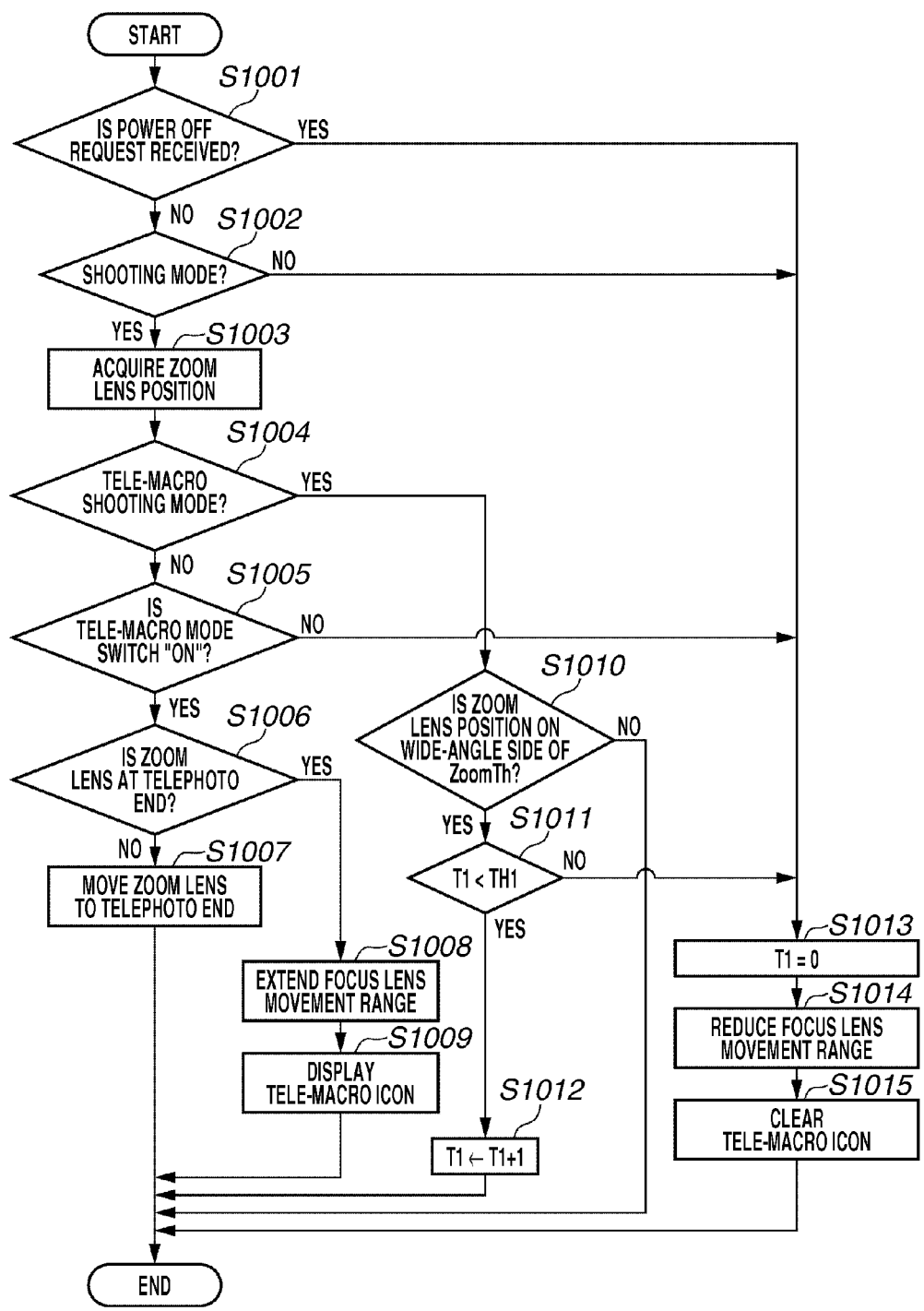
FIG. 10 is a flow chart illustrating the macro shooting determination processing according to the fourth exemplary embodiment.

Next, change to the tele-macro shooting state and a cancel method executed by the system microcomputer 113 will be described with reference to the flowchart in FIG. 10.

In operation S1001, the system microcomputer 113 determines whether a power off request of the imaging apparatus main body is received. If the power off request is received (YES in operation S1001), the processing proceeds to operation S1003. If not (NO in operation S1001), the processing proceeds to operation S1002.

In operation S1002, the system microcomputer 113 determines whether the current mode is the shooting mode. If the current mode is the shooting mode (YES in operation S1002), the processing proceeds to operation S1003. If the current mode is a different mode (e.g., reproduction mode) (NO in operation S1002), then the processing proceeds to operation S1013. In operation S1003, the system microcomputer 113 acquires the current position of the zoom lens 102 (zoom lens position). The acquisition method of the zoom lens position is similar to the method described in the first and the third exemplary embodiments.

In operation S1004, the shooting status determination unit 115 determines whether the current shooting mode is the tele-macro shooting mode. If the current shooting mode is the tele-macro shooting mode (YES in operation S1004), the processing proceeds to operation S1010. If not (NO in operation S1004), the processing proceeds to operation S1005.

In operation S1005, the shooting status determination unit 115 determines whether the tele-macro mode change switch 116 is "ON". If the tele-macro mode change switch 116 is "ON" (YES in operation S1005), the processing proceeds to operation S1006. If the tele-macro mode change switch 116 is "OFF" (NO in operation S1005), the processing proceeds to operation S1013.

In operation S1006, the shooting status determination unit 115 determines whether the current zoom lens position acquired in operation S1003 is on the telephoto side. If the current zoom lens position is on the telephoto side (YES in operation S1006), the processing proceeds to operation S1008. If the current zoom lens position is not on the telephoto side (NO in operation S1006), the processing proceeds to operation S1007. In operation S1007, the system microcomputer 113 controls the zooming drive source 110 so that the zoom lens 102 is moved to the telephoto side.

In operation S1008, the movement range change unit 114 extends the movement range of the focus lens, and the processing proceeds to operation S1009. According to the present exemplary embodiment, when the apparatus is in the tele-macro shooting mode, the control end of the focus lens on the closest end side which has been limited to 1 m in the normal shooting mode is cancelled, and the focus lens may move to the focus closest end. Thus, the focus adjustment is possible in the region including the tele-macro region.

In operation S1009, the shooting status determination unit 115 displays the tele-macro icon on the monitor device 109 so that the user may notice that the mode has been changed to the tele-macro shooting mode. Although the tele-macro icon is displayed when the mode is changed to the tele-macro shooting mode according to the present exemplary embodiment, different icons may be set and displayed for the normal shooting mode and the tele-macro shooting mode. The display method of the icon is similar to the methods described in the first and the third embodiments.

In operation S1004, if the shooting status determination unit 115 determines that the current mode is the tele-macro shooting mode (YES in operation S1004), the processing proceeds to operation S1010.

In operation S1010, the shooting status determination unit 115 determines whether the zoom lens position acquired in operation S1003 is on the wide-angle side of ZoomTh. If the zoom lens position is on the wide-angle side of ZoomTh (YES in operation S1010), the processing proceeds to operation S1011. If the zoom lens position is not on the wide-angle side (i.e., on the telephoto side) of ZoomTh (NO in operation S1010), then the processing ends.

ZoomTh is set in a manner similar to the setting described in the first exemplary embodiment. In operation S1012, the shooting status determination unit 115 increments the macro shooting cancel counter T1 by 1, and then the processing ends. The macro shooting cancel counter T1 is the time counter which is incremented when the zoom lens position is on the wide-angle side of ZoomTh.

In operation S1011, the shooting status determination unit 115 determines whether the macro shooting cancel counter T1 is smaller than TH1. If the macro shooting cancel counter T1 is equal to or larger than TH1, the tele-macro shooting mode is cancelled.

In operation S1011, if the shooting status determination unit 115 determines that the zoom lens position is on the wide-angle side of ZoomTh (i.e., T1 is equal to or greater than TH1) (NO in operation S1011), the processing proceeds to operation S1013. In operation S1013, the shooting status determination unit 115 clears the macro shooting cancel counter T1, and the processing proceeds to operation S1014.

In operation S1014, the movement range change unit 114 reduces the movement range of the focus lens, and sets the controlled closest end as the normal closest end, and the processing proceeds to operation S1015.

In operation S1015, in order to notify the user that the mode has been changed to the normal shooting mode, the shooting status determination unit 115 sets the tele-macro icon set in operation S1009 to non-display state on the monitor device 109, and then the processing ends. The display and non-display method of the icon is similar to the method described in the third exemplary embodiment.

As described above, according to the present exemplary embodiment, since the tele-macro mode may be automatically cancelled, the user does not need to change the mode. Thus, possibility of mis-operation due to the user's failure to cancel the tele-macro mode may be reduced.

Further, the present exemplary embodiment may also be realized by supplying software (e.g., a program or a set of instructions) for realizing the functions of the above exemplary embodiments to a system or an apparatus via a network or via various storage media, and having a processor, or a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one processor, or by a plurality of processors linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a lens driving device, a first lens, a second lens). In addition, the operations in the method transform the elements or parts from one state to another state. The transformation is particularized and focused on controlling a lens driving device. The transformation provides a different function or use such as controlling movement of a first lens, limiting movement of a lens, permitting movement of a lens, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, and program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-286525 filed Dec. 22, 2010 and No. 2010-287085 filed Dec. 24, 2010, which are hereby incorporated by reference herein in their entirety.

What is claimed is:

1. A lens driving device comprising:
a control unit configured to control movement of a first lens to perform zooming operation and a second lens to perform focus adjustment based on information of a position of the first lens and a position of the second lens stored for each object distance;
wherein when the first lens is on a telephoto side of a predetermined position, the control unit limits movement of the second lens to a position corresponding to a second object distance closer than a first object distance, and if a predetermined condition is satisfied after the second lens has reached a predetermined region including the position corresponding to the first object distance, the control unit permits the movement of the second lens to the position corresponding to the second object distance.

2. The lens driving device according to claim 1, wherein the predetermined condition is the second lens reaching the predetermined region a predetermined number of times within a first time period after the second lens has reached the predetermined region.

3. The lens driving device according to claim 1, wherein the predetermined condition is a time period the second lens is in the predetermined region reaching a second time.

4. The lens driving device according to claim 1, wherein the control unit cancels permission of the second lens moving to the position corresponding to the second object distance according to a time period the first lens exists on a wide-angle side of the predetermined position.

5. The lens driving device according to claim 1, wherein when the first lens is on the telephoto side of the predetermined position, the control unit cancels the permission granted to the second lens to move to the position corresponding to the second object distance according to a time period the second lens is on an infinite end side of the position corresponding to the second object distance.

6. The lens driving device according to claim 1, further comprising a display unit configured to display information notifying a user that the movement of the second lens to the position corresponding to the second object distance is permitted.

7. The lens driving device according to claim 1, wherein if power of the lens driving device is turned on after the power is turned off, the control unit limits the movement of the second lens to the position corresponding to the second object distance.

8. The lens driving device according to claim 1, further comprising:
an imaging unit configured to capture an image;
wherein if a mode is changed to an image reproduction mode used for reproducing an image capture by the imaging unit, the control unit inhibits the movement of the second lens to the position corresponding to the second object distance.

9. The lens driving device according to claim 1, wherein if the first lens is on a wide-angle side of the predetermined position and the second lens is on the closest end side of a position corresponding to a predetermined object distance, the control unit relaxes the predetermined condition.

10. The lens driving device according to claim 2, further comprising an imaging unit configured to capture an image;
wherein the first time period is changed according to a shutter speed or a frame rate.

11. A control method of a lens driving device comprising:
controlling movement of a first lens configured to perform zooming operation and a second lens configured to perform focus adjustment based on information of a position of the first lens and a position of the second lens stored for each object distance;
wherein controlling movement comprises:
limiting movement of the second lens to a position corresponding to a second object distance closer than a first object distance when the first lens is on a telephoto side of a predetermined position, and permitting the movement of the second lens to the position corresponding to the second object distance if a predetermined condition is satisfied after the second lens has reached a predetermined region including the position corresponding to the first object distance.

12. A lens system comprising:
a first lens configured to perform zooming operation along an optical axis;
a second lens configured to perform focus adjustment along the optical axis;
a first driving source configured to move the first lens along the optical axis in a telephoto direction toward a telephoto side or in a wide-angle direction toward a wide-angle side;
a second driving source configured to move the second lens along the optical axis to obtain focus,
wherein when the first driving source moves the first lens to the telephoto side of a predetermined position, the second driving source causes movement of the second lens to a position corresponding to a second object distance closer than a first object distance to be limited, and if a predetermined condition is satisfied after the second lens has reached a predetermined region including the position corresponding to the first object distance, the second driving source causes movement of the second lens to the position corresponding to the second object distance to be permitted.

* * * * *